United States Patent [19]

Learner

[11] Patent Number: 4,578,415

[45] Date of Patent: Mar. 25, 1986

[54] AQUEOUS AEROSOL COATING COMPOSITION

[75] Inventor: Eugene L. Learner, Dayton, Ohio

[73] Assignee: DAP Inc., Tipp City, Ohio

[21] Appl. No.: 626,306

[22] Filed: Jun. 29, 1984

[51] Int. Cl.$^4$ .......................... C08K 5/06; C09D 3/80; C09D 5/02

[52] U.S. Cl. ................... 524/322; 524/378; 524/560; 524/561; 524/903

[58] Field of Search ............... 524/322, 903, 560, 561, 524/378

[56] References Cited

U.S. PATENT DOCUMENTS

| | | | |
|---|---|---|---|
| 3,305,510 | 2/1967 | Gander | 524/378 |
| 3,305,511 | 2/1967 | Gander | 524/378 |
| 3,305,512 | 2/1967 | Gander | 524/378 |
| 3,305,513 | 2/1967 | Gander | 524/462 |
| 3,413,254 | 11/1968 | Gander | 524/463 |
| 4,125,499 | 11/1978 | Howard | 524/556 |
| 4,265,797 | 5/1981 | Suk | 524/903 |
| 4,316,929 | 2/1982 | McIntire et al. | 524/561 |
| 4,336,172 | 6/1982 | Marquardt et al. | 524/561 |
| 4,384,661 | 5/1983 | Page et al. | 524/378 |
| 4,420,575 | 12/1983 | Rappaport et al. | 524/378 |
| 4,450,253 | 11/1982 | Suk | 524/378 |
| 4,482,662 | 11/1984 | Rapaport et al. | 523/504 |

FOREIGN PATENT DOCUMENTS

| | | |
|---|---|---|
| 32779 | 1/1981 | European Pat. Off. . |
| 68771 | 1/1983 | European Pat. Off. . |
| 33545 | 3/1979 | Japan . |
| 2036063 | 6/1980 | United Kingdom . |
| 2038352 | 7/1980 | United Kingdom . |
| 2085466 | 4/1982 | United Kingdom . |

OTHER PUBLICATIONS

Rohm & Haas, bulletin "Industrial Coatings", Acryloid WR-748, 1979.

Primary Examiner—Ronald W. Griffin
Attorney, Agent, or Firm—Jacobs & Jacobs

[57] ABSTRACT

An aqueous aerosol coating composition, which comprises an ammonium or amine salt of a drying oil-modified copolymer of an alkyl acrylate of 3 to 5 carbon atoms in the alkyl moiety and an alkyl methacrylate having 3 to 5 carbon atoms in the alkyl moiety, having an average molecular weight of not more than about 9,000, a water soluble organic solvent, water and dimethyl ether.

19 Claims, No Drawings

AQUEOUS AEROSOL COATING COMPOSITION

The present invention relates to aqueous aerosol paint compositions.

Aerosol paint compositions based upon the use of volatile organic solvents as the carrier and propellant for a film-forming polymer are in widespread use, but they suffer from the disadvantages of toxicity and flammability. Water-based aerosol paint formulations have previously been proposed to avoid these problems.

For example, published U.K. patent application No. 2,085,466A and published European patent application No. 68,771 both propose water-based aerosol paint formulations that use as the propellant-active carrier system a mixture of dimethyl ether, water and a water-soluble solvent. Water-soluble polymers and water-dilutable emulsion polymers are said to be useful as the film-forming polymer with the dimethyl ether-based propellant.

The British and European patent applications disclose a wide variety of polymers that can be used as the film-forming polymer, such as acrylic resins, alkyds, epoxy esters and vinyl polymers or copolymers. Surprisingly, I have found that a narrowly defined class of acrylic resins is unexpectedly superior as regards storage stability of the composition. In particular, I have found that the use of a water-soluble ammonium or amine salt of a drying oil-modified, low molecular weight alkyl acrylate/alkyl methacrylate copolymer, such as a copolymer comprising butyl acrylate and isobutyl methacrylate, provides the water-based aerosol paint composition with the required storage stability essential for a commercial product. Unexpectedly, this storage stability has thus far been achieved only with the use of the specified acrylic resin. It has been found, for example, that the use of alkyd resins causes the water-based aerosol paint composition to break down under accelerated stability testing conditions. It has also been found that the use of acrylic resins, other than the specified drying oil-modified acrylate copolymer, gives rise to water-based aerosol paint compositions that are unstable.

The propellant-active carrier system employed in the present invention comprises dimethyl ether, water and a water-soluble organic solvent. As is known, dimethyl ether is a colorless, stable, polar liquid with a boiling point of minus 25° C. Generally, the dimethyl ether will comprise from about 5 to about 60%, preferably from about 25 to about 50% by weight, based on the total weight, of the aerosol paint composition. While it is preferred that the dimethyl ether is the sole propellant, under some circumstances from 0 to about 50% by weight of the dimethyl ether may be replaced by another liquid propellant, such as an aliphatic hydrocarbon or a fluorinated hydrocarbon. Further, a gaseous propellant may also be used, if desired, such as nitrogen, carbon dioxide, nitrous oxide and the like.

Water is present in the composition of the present invention in an amount of from about 10 to about 70%, preferably from about 20 to about 60%, by weight of the total weight of the composition.

Also employed in the water-based aerosol paint composition of the present invention, is a water-soluble organic solvent, such as straight or branched chain monohydric alcohols, for example of from 1 to about 6 carbon atoms, glycol ethers, esters, ketones, and the like. Suitable organic solvents include methanol, ethanol, n-propanol, isopropanol, n-butanol, acetone, ethyl acetate, mono-alkyl ethers of ethylene or propylene glycol having from one to about six carbon atoms in the alkyl moiety, such as propylene glycol methyl ether, and ethylene glycol monobutyl ether, ethylene glycol mono-alkyl acetates of 1 to about 6 carbon atoms in the alkyl moiety, such as ethylene glycol monomethyl ether acetate, diacetone alcohol and ester alcohols and the like. Suitably, the water-soluble organic solvent will comprise a mixture of a low-molecular weight organic solvent, such as an alkanol, alkyl ester or alkyl ketone containing from 1 to about 6 carbon atoms in the alkyl moiety, with a higher molecular weight, water-soluble, polar organic solvent that acts as a coupling organic solvent, such as the above-mentioned mono-alkyl ethers of ethylene or propylene glycol or the ethylene glycol mono-alkyl acetates. Generally, the water-soluble organic solvent will be present in an amount of from about 0.5 to 80%, preferably from about 0.5 to about 20% by weight, based on the total weight of the composition.

As stated above, the improvement in the storage stability of the water-based aerosol paint composition of the present invention arises from the use of the water-soluble amine salt of the specified acrylate copolymer, the nature of the copolymer and its low molecular weight both contributing to the required water-solubility. For example, high molecular weight acrylic resins that are water dispersable and that form emulsions, rather than solutions, such as the acrylic resin sold by Rohm & Haas under the designation W.L.91 and the acrylic resin sold by Reichold Chemicals under the designation 90-587 resin, are unsuitable for use in the present invention.

The drying oil-modified low molecular weight acrylate copolymer used in the present invention comprises copolymerized units of an alkyl acrylate of 3 to 5 carbon atoms in the alkyl moiety and an alkyl methacrylate having 3 to 5 carbon atoms in the alkyl moiety. Generally, the copolymer will comprise from about 10 to about 35%, preferably from about 15 to about 30%, by weight of the alkyl acrylate and from about 20 to about 70%, preferably from about 30 to about 60% by weight of the alkyl methacrylate, based on the total weight of the copolymer composition. Presently preferred monomers are from about 15 to about 30% butyl acrylate and from about 30 to about 60% isobutyl methacrylate, by weight, based on the weight of the copolymer composition. In addition, the copolymer composition comprises from about 10 to about 30% of a copolymerized, drying oil, such as linseed oil, soya oil, tung oil, safflower oil, or other polyunsaturated oils, and from about 10 to about 20%, based on the copolymer composition, of a copolymerized, olefinically unsaturated acid or acid anhydride, such as acrylic acid, methacrylic acid, fumaric acid, itaconic acid, maleic acid and the like or an anhydride thereof. Suitably, the copolymer will have an average molecular weight of from about 150 to about 9,000, preferably from about 500 to about 3,000, most preferably from about 1,000 to about 2,000.

The specified acrylate and methacrylate monomers, in conjunction with the copolymerized drying oil, provide the copolymer composition with the desired air-curing, film forming properties, while the copolymerized unsaturated carboxylic acid when neutralized with a strong base provides a hydrophillic moiety that imparts water-solubility to the otherwise hydrophobic copolymer composition. Rohm & Haas "Acryloid" WR-748 is a drying oil-modified low molecular weight copolymer of butyl acrylate and isobutyl methacrylate having a molecular weight not more than 9,000, and this copolymer, or its substantial equivalent, is presently preferred for use in the present invention. Acryloid WR-748 is sold as a solution of the copolymer in an organic solvent, usually with 60% solids, and is neutralized as described below to provide the water-soluble ammonium or amine salt thereof.

While it is possible to obtain the acrylate copolymer in the form of its amine salt, generally acrylate copolymers are available commercially in the unneutralized form. Whether the acrylate copolymer is specially prepared or is purchased commercially, the copolymer will be neutralized, at least in part, with mmmonia, an alkyl amine or heterocyclic amine having up to 6 carbon atoms or with a mono- di- or trialkanol amine having from 1 to about 6 carbon atoms in each alkanol moiety. An additional quantity of the neutralizing agent may also be present so that the final aerosol paint composition will have an alkaline pH, such as from about 7.2 to about 10. Suitable neutralizing agents include aqueous ammonium hydroxide, morpholine, triethanolamine, methanolamine and ethanolamine and the like.

Suitably, the water-soluble salt of the acrylate copolymer is present in an amount of from about 1 to about 60% preferably from about 2 to about 40%, by weight based on the total weight of the aerosol paint composition.

As is known, the aerosol paint composition may also include a surfactant, pigment, pH stabilizer antifoam agent, plasticizer, drying agents and the like. In general, there will be from 0 to about 20%, more usually from 0 to about 15%, by weight based on the total weight of the composition of the pigment. Suitably, the other additives, when present, will not exceed about 3% by weight, based on the total weight of the composition, for each additive, and usually only up to about 1 or about 2% of each other additive will be present.

The present invention is illustrated in terms of a preferred embodiment in the following example. In this example and in the specification and claims of this application, all parts, proportions and percentages are by weight unless otherwise specified.

EXAMPLE 1

A white, water-based aerosol paint composition was prepared and packaged in an aerosol can. The composition was prepared by mixing 57.14 parts by weight of the following paint formulation with 42.86 parts by weight of dimethyl ether as the sole propellant.

| PAINT FORMULATION | Parts |
| --- | --- |
| Rohm & Haas "Acryloid" WR-748 Resin (60%)* | 23.33 |
| Ammonium Hydroxide (29° Be) | 3.33 |
| Butyl Cellosolve (2-butoxyethanol) | 8.33 |
| Isopropanol (99%) | 4.44 |
| Water | 47.89 |
| Titanium Dioxide | 11.11 |
| Cobalt neodecanoate | 0.11 |
| Manganese neodecanoate | 0.06 |
| Active-8 dryer (1,10-phenanthrolene) | 0.17 |
| Other Additives** | 1.23 |
| TOTAL | 100.00 |

*Acryloid WR-748 is a solution of 60 ± 1% of the water-soluble, drying oil modified butyl acrylate/isobutyl methacrylate copolymer in 50/50 by weight mixture of isopropyl alcohol and n-propoxy propanol.
**The other additives were a suspension agent, defoamer and mar-resistant agent.

The above-mentioned paint formulation and the paint composition containing dimethyl ether and paint formulation were stored in containers, and both had excellent performance characteristics after storage for over 10 months at 120° F.

EXAMPLE 2

Additional paint compositions were prepared using the ammonium salt of "Acryloid" WR-748 copolymer of Example 1 with dimethyl ether, water and water-soluble solvent as the propellant active carrier system in a variety of other colors, as well as a clear paint composition.

I claim:

1. An aqueous aerosol coating composition, which comprises a water soluble ammonium or amine salt of a drying oil-modified copolymer of an alkyl acrylate of 3 to 5 carbon atoms in the alkyl moiety and an alkyl methacrylate having 3 to 5 carbon atoms in the alkyl moiety, having an average molecular weight of not more than about 9,000, a water soluble organic solvent, water and dimethyl ether.

2. The composition according to claim 1, wherein said drying-oil modified copolymer comprises copolymerized units of from about 10 to about 35% of said alkyl acrylate, from about 30 to about 60% of said alkyl methacrylate, from about 20 to about 70% of an unsaturated carboxylic acid, and from about 10 to about 30% of a polyunsaturated drying oil, by weight, based on the weight of said copolymer.

3. The composition according to claim 2. wherein said alkyl acrylate is from about 15 to about 30% and said alkyl methacrylate is from about 30 to about 60%, by weight, based on the weight of said copolymer.

4. The composition according to claim 1, comprising:
   a. from about 1 to about 60% of said copolymer salt;
   b. from about 10 to about 70% of water;
   c. from about 0.5 to about 80% of said water-soluble organic solvent; and
   d. from about 5 to about 60% of said dimethyl ether.

5. The composition according to claim 4, comprising:
   a. from about 2 to about 40% of said copolymer salt;
   b. from about 20 to about 60% of water;
   c. from about 0.5 to about 20% of said water-soluble organic solvent; and
   d. from about 25 to about 50% of said dimethyl ether.

6. The composition according to claim 1, comprising from 0 to 20% of a pigment and from 0 to 3% each of an additive selected from the group consisting of a surfactant, pH stabilizer, antifoam agent, plasticizer and drying agent, based on the total weight of the composition.

7. The composition according to claim 6, wherein said pigment is from about 0 to 15% and the total weight of said additives does not exceed 3%, based on the total weight of the composition.

8. An aqueous aerosol coating composition, which comprises a water-soluble ammonium or amine salt of a drying oil-modified copolymer of butyl acrylate and isobutyl methacrylate having an average molecular weight of not more than about 9000, a water soluble organic solvent, water and dimethyl ether.

9. The composition according to claim 8, wherein said copolymer comprises copolymerized units of from about 10 to about 35% of said butyl acrylate, from about 30 to about 60% of said isobutyl methacrylate, from about 20 to about 70% of an unsaturated carboxylic acid, and from about 10 to about 30% of a polyunsaturated drying oil, by weight, based on the weight of said copolymer.

10. The composition according to claim 9, wherein said copolymer comprises from about 15 to about 30% of said butyl acrylate and from about 30 to about 60% of said isobutyl methacrylate, by weight, based on the weight of said copolymer.

11. The composition according to claim 9, wherein said copolymer has an average molecular weight of from about 150 to about 9000.

12. The composition according to claim 10, wherein said copolymer has an average molecular weight of from about 500 to 3000.

13. The composition according to claim 8, comprising:
   a. from about 1 to about 60% of said copolymer salt;
   b. from about 10 to about 70% of water;
   c. from about 0.5 to about 80% of said water-soluble organic solvent; and
   d. from about 5 to about 60% of said dimethyl ether.

14. The composition according to claim 13, comprising:
   a. from about 2 to about 40% of said copolymer salt;
   b. from about 20 to about 60% of water;
   c. from about 0.5 to about 20% of said water-soluble organic solvent; and
   d. from about 25 to about 50% of said dimethyl ether.

15. The composition according to claim 8, comprising from 0 to 20% of a pigment and from 0 to 3% each of an additive selected from the group consisting of a surfactant, pH stabilizer, antifoam agent, plasticizer and drying agent, based on the total weight of the composition.

16. The composition according to claim 11, comprising:
   a. from about 1 to about 60% of said copolymer salt;
   b. from about 10 to about 70% of water;
   c. from about 0.5 to about 80% of said water-soluble organic solvent; and
   d. from about 5 to about 60% of said dimethyl ether.

17. The composition according to claim 12, comprising:
   a. from about 1 to about 60% of said copolymer salt;
   b. from about 10 to about 70% of water;
   c. from about 0.5 to about 80% of said water-soluble organic solvent; and
   d. from about 5 to about 60% of said dimethyl ether.

18. The composition according to claim 16, comprising:
   a. from about 2 to about 40% of said copolymer salt;
   b. from about 20 to about 60% of water;
   c. from about 0.5 to about 20% of said water-soluble organic solvent; and
   d. from about 25 to about 50% of said dimethyl ether.

19. The composition according to claim 17, comprising:
   a. from about 2 to about 40% of said copolymer salt;
   b. from about 20 to about 60% of water;
   c. from about 0.5 to about 20% of said water-soluble organic solvent; and
   d. from about 25 to about 50% of said dimethyl ether.

* * * * *